United States Patent
Okamura et al.

(10) Patent No.: US 7,081,424 B2
(45) Date of Patent: Jul. 25, 2006

(54) HIGH-STRENGTH, HIGHLY THERMALLY CONDUCTIVE SINTERED COMPACT OF CUBIC BORON NITRIDE

(75) Inventors: Katsumi Okamura, Itami (JP); Satoru Kukino, Itami (JP); Shinya Uesaka, Itami (JP); Tomohiro Fukaya, Itami (JP)

(73) Assignee: Sumitomo Electric Hardmetal Corp., Itami (JP)

( * ) Notice: Subject to any disclaimer, the term of this patent is extended or adjusted under 35 U.S.C. 154(b) by 50 days.

(21) Appl. No.: 10/981,431

(22) Filed: Nov. 3, 2004

(65) Prior Publication Data

US 2005/0143252 A1    Jun. 30, 2005

(30) Foreign Application Priority Data

Dec. 25, 2003 (JP) .............................. 2003-430525

(51) Int. Cl.
 *C04B 35/5831* (2006.01)
(52) U.S. Cl. .......................... 501/96.4; 501/87; 51/307
(58) Field of Classification Search .................. 501/87, 501/96.3, 96.4
See application file for complete search history.

(56) References Cited

U.S. PATENT DOCUMENTS

| 4,334,928 A | 6/1982 | Hara et al. |
|---|---|---|
| 6,001,758 A | 12/1999 | Fukaya et al. |
| 6,008,153 A * | 12/1999 | Kukino et al. ............. 501/96.4 |
| 6,265,337 B1 * | 7/2001 | Kukino et al. ............. 501/96.4 |

FOREIGN PATENT DOCUMENTS

| JP | 53-077811 | 7/1978 |
|---|---|---|
| JP | 56-069350 | 6/1981 |
| JP | 59-057905 | 4/1984 |
| JP | 59-073410 | 4/1984 |
| JP | 61-031306 | 2/1986 |
| JP | 61-179847 | 8/1986 |
| JP | 61-179848 | 8/1986 |
| JP | 02-035931 | 2/1990 |
| JP | 05-287433 | 11/1993 |
| JP | 09-169971 | 6/1997 |
| JP | 10-182242 | 7/1998 |

* cited by examiner

*Primary Examiner*—Karl Group
(74) *Attorney, Agent, or Firm*—W. F. Fasse; W. G. Fasse

(57) ABSTRACT

The present high-strength, highly thermally conductive sintered compact of cubic boron nitride contains cubic boron nitride (cBN) grains and a binder binding the grains. More specifically, it is formed of at least 40% by volume and at most 85% by volume of cBN grains, and a binder corresponding to the remainder and formed of at least one selected from the group consisting of a nitride, a carbide, a boride, and an oxide of an element belonging to the 4a, 5a and 6a groups of the periodic table and a solid solution thereof, an aluminum compound, and an unavoidable impurity, and the cBN grains contain at most 0.03% by mass of Mg and at least 0.001% by mass and at most 0.05% by mass of Li.

8 Claims, No Drawings

HIGH-STRENGTH, HIGHLY THERMALLY CONDUCTIVE SINTERED COMPACT OF CUBIC BORON NITRIDE

BACKGROUND OF THE INVENTION

1. Field of the Invention

The present invention relates generally to sintered compacts formed mainly of cubic boron nitride (cBN). In particular, the present invention contemplates precisely controlling the sintered compact's catalyst content to provide high-strength, highly thermally conductive sintered compact of cBN excellent in chipping resistance and crater wear resistance.

2. Description of the Background Art

A sintered compact of large hardness formed of cubic boron nitride has conventionally been known. For example, Japanese Patent Laying-Open No.53-77811 discloses a sintered compact of cBN containing 20–80% by volume of cBN, and a Ti ceramic binder as the remainder. The sintered compact, however, does not provide satisfactory life in application to a tool used for interrupted cutting, high speed cutting or similarly, high efficiency cutting. Accordingly the sintered compact is improved in toughness, thermal resistance and the like by improving the binder, covering cBN grains with ceramic to provide enhanced binding strength, improved dispersiveness, and the like.

A sintered compacts with the Ti ceramic binder of Japanese Patent Laying-Open No. 53-77811 improved to provide increased toughness is disclosed for example in Japanese Patent Laying-Open Nos. 56-69350, 61-179847, 61-179848 and 5-287433. The disclosed sintered compact has large toughness and is suitable for interrupted cutting of hardened steel and the like. Furthermore, a binder is placed to surround cBN grains to hold the grains together to provide a sintered compact preventing the grains from being directly bound together, as disclosed in Japanese Patent Laying-Open No. 10-182242. Thus a binder itself is improved or cBN grains prevented from mutual direct contact to attempt to provide a sintered compact of cBN with increased toughness so as to use it for interrupted cutting of hardened steel having large hardness.

SUMMARY OF THE INVENTION

However, the above conventional examples also have the following disadvantage: the above improved examples do bind cBN grains and a binder more firmly and increase the binder in toughness. However, they were not able to completely prevent the grains from mutual contact. Furthermore, even if cBN grains are covered, as described in Japanese Patent Laying-Open No. 10-182242, larger cBN contents provide increased probability of the grains' mutual, direct contact. Such a portion having cBN grains in mutual contact often remains unsintered, and such a small unsintered portion develops chipping. As such, more heavily loading cutting conditions, sharper interrupted geometries of hardened steel of large hardness, and the like help a defective unsintered portion's effect to manifest and satisfactory tool life cannot be obtained. The "sharper interrupted geometries" will be described later.

The present invention overcomes the above disadvantage by a concept different than conventional. More specifically, the present invention directly sinters cBN grains together (hereinafter direct bonds in cBN grains will be referred to as a "neck growth") to enhance toughness and thermal conductance simultaneously to obtain a significantly strong and highly thermally conductive sintered compact of cubic boron nitride excellent in both chipping resistance and crater wear resistance to provide a tool suitable for heavy interrupted cutting of hardened steel of large hardness.

The present invention in one aspect provides a high-strength, highly thermally conductive sintered compact of cubic boron nitride containing cubic boron nitride (cBN) grains and a binder binding the cBN grains together, the sintered compact being formed of: at least 40% by volume and at most 85% by volume of cBN grains; and a binder corresponding to a remainder and formed of at least one selected from the group consisting of a nitride, a carbide, a boride, and an oxide of elements belonging to the 4a, 5a and 6a groups of the periodic table and a solid solution thereof, an aluminum compound, and an unavoidable impurity, and the cBN grains contain at most 0.03% by mass of Mg and at least 0.001% by mass and at most 0.05% by mass of Li.

The present sintered compact having large hardness and intended for use as a tool contains at least 40% by volume and at most 80% by volume of cBN. If less 40% by volume of cBN is contained then in the sintered compact the binder, poor in strength, is relatively increased, and when the sintered compact is used for interrupted cutting, the binder's portion would initially develop defect. If more than 85% by volume of cBN is contained, cBN grains are held by a relatively reduced amount of the binder. Consequently the cBN grains tend to drop, and excellently thermally resistant Ti nitride, carbide and carbonitride are relatively reduced in amount and wear resistance is significantly impaired. The cBN content of at least 40% by volume and at most 85% by volume can prevent cBN grains from readily dropping and also maintain high wear resistance.

A compound selected from the group consisting of nitride, carbide, boride and oxide of elements belonging to the 4a, 5a and 6a groups in the periodic table and a solid solution thereof is mixed with cBN grains, aluminum metal or aluminum compound and sintered. As they are sintered, aluminum metal, aluminum compound and the like react with cBN or other binder to provide aluminum compound to bind the binder and cBN grains together more firmly. Thus there can be obtained a sintered compact of cBN suitable for heavy interrupted cutting of hardened steel of large hardness.

Furthermore the present inventors have found that a sintered compact including cBN grains containing at most 0.03% by mass of Mg and at least 0.001% by mass and at most 0.05% by mass of Li can provide a significant improvement in chipping resistance as well as crater wear resistance hardly achieved simply by improving a binder. It has been found that Li at those portions of cBN grains, respectively, which are in mutual contact has a catalytic effect helping to bind the grains together. Such portion exposed to the Li's catalytic effect can have a neck growth, and the sintered compact can thus have larger strength than that with the grains in simple, mechanical contact. In addition, the cBN grains, superior in thermal conductance to ceramic binder, that are continuously structured can help to transmit heat generated in cutting and thus provide improved thermal resistance. Furthermore, Mg forms an oxide in cBN grains and interface, and the oxide (MgO) has a high melting point and does not have such a catalytic effect as described above. In addition, when MgO exists in cBN grains unharmonic vibration exerts an effect and thermal conduction in the grains having phonon conductance is prevented. In the present invention an effect of an element helping to bind cBN grains together will be referred to as catalytic effect.

Desirably the sintered compact includes cBN grains containing at most 0.01% by mass of Mg and at least 0.01% by mass and at most 0.03% by mass of Li. The grains can be bound together further firmly, and chipping resistance and crater wear resistance can further be improved.

Desirably the sintered compact includes cBN grains containing a total of at least 0.001% by mass and at most 0.3% by mass of at least one element selected from Ca, Sr, Ba and Be, since Ca, Sr, Ba and Be, as well as Li, at those portions of cBN grains, respectively, which are in mutual contact act as catalyst. If the element's or elements' content is less than 0.001% by mass it does not have catalytic effect. Promoting the neck growth requires a total amount of catalyst of the element(s) of at most 0.3% by mass. If the element(s) exceed 0.3% by mass, the excess provides defect. Furthermore, as the elements are also inferior in thermal resistance to cBN, the sintered compact of cBN is reduced in strength and thermal resistance.

Desirably the sintered compact includes cBN grains containing a total of at least 0.001% by mass and at most 0.5% by mass of at least one element selected from Si, Ga and La. The present inventors have found that adding Si, Ga and La can amplify Li's catalytic effect to form neck growth firmly in cBN grains and thus bind the grains to achieve high crystallinity and excellent toughness. At least 0.001% by mass of the element(s) promotes reinforcement of the neck growth. Forming a sufficiently firm neck growth at an interface of mutually directly adjacent cBN grains requires 0.5% by mass of the element(s). If the element's or elements' content exceeds 0.5% by mass the excess provides defect. Furthermore, as the elements are also inferior in thermal resistance to cBN, the sintered compact of cBN is reduced in strength and thermal resistance.

Desirably the sintered compact includes cBN grains containing a total of at least 0.01% by mass and at most 0.1% by mass of at least one element selected from Ca, Sr, Ba and Be. The sintered compact of cBN can further be enhanced in strength and thermal resistance.

More preferably the sintered compact includes cBN grains containing a total of at least 0.05% by mass and at most 0.3% by mass of at least one element selected from Si, Ga and La. The sintered compact of cBN can further be enhanced in strength and thermal resistance.

Desirably the sintered compact of cBN contains at most 5% by mass of oxygen and the binder contains at least 5% by mass and at most 40% by mass of Al. Mg remaining in cBN grains forms an oxide, which (MgO) has a high melting point and there is not catalytic effect in sintering. Accordingly, the sintered compact of cBN preferably contains at most 5% by mass of oxygen. This provides a reduced probability that MgO, which does not have catalytic effect and prevents binding, exists between cBN grains and at an interface with the binder. Thus the sintered compact of cBN is increased in strength and thermal conductance and enhanced in chipping resistance and crater wear resistance.

Furthermore the binder preferably contains at least 5% by mass and at most 40% by mass of Al. At least 5% by mass Al allows cBN grains and the binder to sufficiently be bound together and at most 40% by mass of Al provides an appropriate amount of nitride, carbide, carbonitride of Ti excellent in thermal resistance, and hence enhanced crater wear resistance. The sintered compact that contains at most 5% by mass of oxygen and the binder containing at least 5% and at most 40% by mass of Al can provide excellent chipping resistance and excellent crater wear resistance.

Desirably the sintered compact of cBN contains at least 50% by volume and less than 70% by volume of cBN grains. More specifically, the sintered compact of cBN that contains at least 50% by volume of cBN grains provides an increased probability of the grains' mutual contact and by the aforementioned catalytic effect the sintered compact is improved in strength and thermal conductance. If the sintered compact contains less than 70% by volume of cBN grains, the binder holding the grains is relatively increased in amount so that a tool formed of the sintered compact and used for interrupted cutting can still provide stable life. For the above reason at least 50% by volume and less than 70% by volume of cBN grains is preferably contained.

When the present sintered compact is used to produce a cutting tool, the tool allows conventionally difficult, heavy interrupted cutting of hardened steel of large hardness. "Heavy interrupted cutting" first indicates more frequent interruption, as indicated in the examples, and second indicates that an interrupted geometry results in a sharper geometry. In an embodiment described hereinafter a round bar cut as a material is provided with a large number of axially parallel U, V or similar grooves, and turned to conduct a test for heavy interrupted cutting.

When "U" and "V" are compared, "U" is associated with heavier interrupted cutting or sharper interrupted geometry for the following reason: When the tool contacts the U groove, the groove first has a wall contacted by the tool's face, and the tool experiences large stress. In contrast, when the tool contacts the V groove, the groove has a wall forming an angle with the tool's face, and the cutting edge first contacts the wall and the wall subsequently contacts the face. As such, the tool experiences stress smaller than when it contacts the U groove.

The foregoing and other objects, features, aspects and advantages of the present invention will become more apparent from the following detailed description of the present invention.

DESCRIPTION OF THE PREFERRED EMBODIMENTS

The present invention can bind cBN grains more firmly and also bind the cBN grains and a binder more firmly to provide a sintered compact with increased strength. This is intended to provide a sintered compact of cBN enhanced in chipping resistance and crater wear resistance.

The present inventors have found, as has been described previously, that when a tool formed of sintered compact of cBN is used for heavy interrupted and high efficiency cutting of hardened steel of large hardness an unsintered portion resulting from cBN grains in mutual contact develops chipping. To reinforce such portion the present inventors have positively studied and as a result found that the type and content of a catalytic component remaining in the cBN grains in a small amount significantly affect strength acting to bind the cBN grains together. Note that before it is sintered cBN typically contains the elements B and N as well as Mg, Li, Ca or similar element. In the present invention such an element exhibits a catalytic effect and its content has significance.

Li in cBN grains exists as metal Li or $Li_2O_3$, either one of which has a low melting point, and it has been found that when the cBN is sintered, the Li reacts with adjacent B, N and the like and forms $Li_3BN_2$ or similar catalyst, and facilitates a neck growth of the cBN grains. In contrast, Mg readily forms oxide and in cBN grains exists mainly in the form of MgO, which has a high melting point and does not again act as catalyst when the cBN is sintered.

As such, if cBN grains contain more than 0.03% by mass of Mg, non-catalytic MgO increases as an impurity in the cBN grains and the sintered compact is reduced in strength. If cBN grains contain less than 0.001% by mass of Li, an insufficient catalytic effect is provided, and for 0.05% by mass or more thereof they provide defect, and as Li is inferior in thermal resistance to cBN, the sintered compact of cBN is reduced in strength and thermal resistance.

Such a composition as described above provides an Li compound acting as a catalyst to firmly bind cBN grains at the portions that are in mutual contact to provide a sintered compact cBN significantly increased in strength. Furthermore, cBN grains have high thermal conductance, and cBN grains successively bound together at an increased ratio improve the sintered compact of cBN in thermal conductance and provide significantly improved crater wear resistance.

Conventionally it has been considered that a sintered compact cBN is better formed of cBN grains inexpensive and more fracturable, containing a large amount of the element Mg, since it has been common sense that finer grains provide a sintered compact with larger strength, and cBN grains more fracturable in finer size have accordingly been used. In that sense, the present invention disproves conventional common sense.

The present invention employs cubic boron nitride (cBN) grains produced by processing hexagonal boron nitride (hBN) and a catalyst at high pressure and high temperature, which are a condition to be satisfied to thermally stabilize cBN. The catalyst, as typically known, is alkali metal or alkaline earth metal, or its nitride, their compound of nitride or the like.

Different types of catalyst added allow synthesized cBN grains to vary in crystallinity, toughness and the like, as disclosed for example in Japanese Patent Laying-Open Nos. 59-57905, 59-73410, 61-31306, 2-35931 and 9-169971. The publications describe that adding a different type of catalyst provides cBN grains with different crystallinity and hence different toughness. The publications, however, all relate to improvements in application as grinding abrasive grains and fail to refer to any characteristic of a sintered compact when the catalysts are used as a source material for the sintered compact.

For example if a Li based catalyst is used, cBN grains excellent in crystallinity are provided and used for electrodeposition abrasive, metal bond abrasive, and the like. In contrast, if Mg based catalyst is used, more fracturable cBN grains are obtained and used for vitrified bond abrasive, truing abrasive, and the like. The catalyst is of a substance formed of an element taken into cBN grains, and analyzing the grains allows the substance to be estimated.

EXAMPLE 1

Hard metal pot and bowl are used to mix TiN, TiCN and TiHfN or a mixture of at least two thereof and Al together at a ratio in mass of 78:22. The obtained powder is thermally treated in a vacuum at 1200° C. for 30 minutes and the obtained compound is fractured to obtain a powdery binder containing Al mainly in the forms of $TiAl_3$, $Ti_2AlN$. Then the binder and a variety of cBN powders having an average grain size of 1.5 μm, as shown in Table 1, (manufacturer: Sumitomo Electric Hard Metal, trade name: SUMIBORON) are mixed together at a blending ratio shown in Table 1, and held in a vacuum furnace at 900° C. for 20 minutes and thus degassed. Furthermore this powder is sintered under 5 GPa at 1300° C. for 20 minutes. The obtained sintered compact is cut, and ground as required to prepare a sample thereof for analysis and that for a cutting test.

X-ray diffraction (XRD) is employed to examine compounds contained in the sample. In all of the samples shown in Table 1, compounds presumed to be cBN, $TiB_2$, AlN and $AlB_2$ are detected, and other compounds detected are shown in Table 1. Still another sample is placed in a sealed container and immersed in a mixture of fluoric acid and nitric acid for 48 hours. Binder phase is all dissolved in the mixture of fluoric acid and nitric acid and the cBN grains do not dissolve and remain. The grains contain the elements Mg, Li, Ca, Sr, Ba and Be, which are subjected to inductively coupled plasma (ICP) spectrometry for quantitative measurement, as shown in Table 1. Furthermore, the sintered cBN compact's cBN grain content is calculated in accordance with a blending composition and represented in % by volume, as shown in Table 1. More specifically, the mass of the cBN remaining after the above described acid treatment and theoretical density are used to calculate the volume of the cBN grains in the sintered compact and from the volume of the sintered compact of cBN measured before the acid treatment it is obtained.

The sample of the sintered compact for the cutting test is used to produce a tool (ISO model: SNGA120408). The tool is used for heavy interrupted cutting of hardened steel to examine the tool's life attained before the tool chips or is similarly damaged. The test is conducted under the following conditions:

material to be cut: carburized hardened steel SCr420H having a hardness of HRC62, a diameter of 100 mm and a length of 300 mm, with four axial U grooves; and cutting conditions: cutting speed V=150 m/min., feed rate f=0.1 mm/rev., depth of cut d=0.2 mm, dry-cutting.

The result was shown in Table 1.

TABLE 1

| Sample No. | cBN (% by volume) | Compound | Catalytic Element in cBN Grains (% by mass) | | | Life (min.) |
|---|---|---|---|---|---|---|
| | | | Mg | Li | Others | |
| 1-1 | 45 | TiCN | 0.001 | 0.01 | Ca: 0.05 | 23.1 |
| 1-2 | 50 | TiN | 0.002 | 0.01 | Ca: 0.06 | 28.8 |
| 1-3 | 55 | TiN | 0.002 | 0.01 | Ca: 0.05, Sr: 0.05 | 30.7 |
| 1-4 | 60 | TiN | 0.001 | 0.03 | | 28.5 |
| 1-5 | 60 | TiN | 0.001 | 0.01 | Ca: 0.07 | 32.3 |
| 1-6 | 60 | TiHfN | 0.003 | 0.01 | Ba: 0.10 | 31.9 |
| 1-7 | 60 | TiN | 0.02 | 0.01 | | 26.4 |
| 1-8 | 65 | TiN | 0.001 | 0.02 | Ca: 0.05, Sr: 0.06 | 27 |
| 1-9 | 65 | TiN | 0.001 | 0.01 | Ca: 0.04, Sr: 0.03 | 35.1 |
| 1-10 | 65 | TiCN | 0.001 | 0.01 | Ca: 0.06, Be: 0.03 | 33.1 |
| 1-11 | 65 | TiN | 0.002 | 0.02 | Ca: 0.09 | 34 |
| 1-12 | 83 | TiN | 0.001 | 0.01 | Ca: 0.05 | 21.4 |
| 1-13 | 35* | TiCN | 0.001 | 0.01 | Ca: 0.05 | 7.8 |
| 1-14 | 55 | TiN | 0.05* | 0.01 | | 13.6 |
| 1-15 | 60 | TiN | 0.07* | 0.01 | | 15.6 |
| 1-16 | 65 | TiN | 0.05* | 0.07* | Ca: 0.53 | 15.9 |
| 1-17 | 65 | TiCN | 0.08* | 0.01 | | 13.2 |
| 1-18 | 90* | TiN | 0.002 | 0.01 | Ca: 0.06 | 5.7 |

*Comparative Example

As it is apparent from Table 1, Sample No. 1-13 containing less than 45% by volume of cBN and Sample No. 1-18 containing more than 85% by volume of cBN have significantly short life before they chip or are similarly damaged. Sample Nos. 1-14 to 1-17 with cBN grains having a Mg content exceeding 0.03% by mass provide short life, half that of Sample Nos. 1-1 to 1-12 with the grains having a Mg content of less than 0.03% by mass before they chip or are similarly damaged. It is thus understood that the present invention produces a sintered compact of cBN providing longer life before it chips or is similarly damaged. Furthermore, Sample No. 1-7 with cBN grains having a Mg content exceeding 0.01% by mass and less than 0.03% by mass has life slightly shorter than Sample Nos. 1-4, 1-5 and 1-6 equal in cBN content and having a Mg content of at most 0.01% by mass before they chip or are similarly damaged. Furthermore, Sample No. 1-8 containing a total of more than 0.1% by mass of at least one element selected from Ca, Sr, Ba and Be in the cBN grains, has life slightly shorter than Sample No. 1-9 equal in Mg and cBN contents, respectively, and containing a total of at least 0;01% by mass and at most 0.1% by mass of at least one element selected from Ca, Sr, Ba and Be before they chip or are similarly damaged. Furthermore, Sample Nos. 1-1 and 1-12 having cBN contents of less than 50% by volume and at least 70% by volume, respectively, have life slightly shorter than Sample Nos. 1-2 to 1-11 having a cBN content of at least 50% by volume and less than 70% by volume before they chip or are similarly damaged.

EXAMPLE 2

Hard metal pot and bowl are used to mix TiN and Al together at a ratio in mass of 75:25. The obtained powder is thermally treated in a vacuum at 1200° C. for 30 minutes and the obtained compound is fractured to obtain a powdery binder. Then the binder and a variety of cBN powders having an average grain size of 1.5 μm, as shown in Table 2, (manufacturer: Sumitomo Electric Hard Metal, trade name: SUMIBORON) are mixed together at a ratio in volume of 40:60, and held in a vacuum furnace at 900° C. for 20 minutes and thus degassed. Furthermore this powder is sintered under 5 GPa at 1300° C. for 20 minutes. The obtained sintered compact is processed to prepare a sample thereof for analysis and that for a cutting test.

The sample for analysis is handled similarly as described in Example 1, placed in a shield container and immersed in a mixture of fluoric acid and nitric acid for 48 hours. Binding phase is dissolved therein. Residual cBN grains are subjected to ICP for quantitative measurement to examine the contents of a variety of elements Mg, Li, Ca, Sr, Si, Ga and La, as shown in Table 2.

TABLE 2

| Sample No. | Catalytic Element in cBN Grains (% by mass) | | | Life (min.) |
| --- | --- | --- | --- | --- |
| | Mg | Li | Others | |
| 2-1 | 0.001 | 0.01 | Ca: 0.06, Si: 0.15 | 34.1 |
| 2-2 | 0.001 | 0.01 | Ca: 0.06, Sr: 0.02, Si: 0.17 | 32.9 |
| 2-3 | 0.002 | 0.01 | Ca: 0.07, Si: 0.4 | 28.8 |
| 2-4 | 0.001 | 0.01 | Ca: 0.07, Si: 0.03 | 25.4 |
| 2-5 | 0.001 | 0.01 | Ca: 0.06 | 21.7 |
| 2-6 | 0.002 | 0.01 | Ca: 0.05, Ga: 0.2 | 32.2 |
| 2-7 | 0.001 | 0.01 | Ca: 0.07, Ga: 0.45 | 27.1 |
| 2-8 | 0.001 | 0.02 | Ca: 0.13, La: 0.13 | 33.5 |
| 2-9 | 0.001 | 0.02 | Ca: 0.13, La: 0.35 | 28.7 |

The sintered compact for the cutting test is used to produce a tool (ISO model: SNGA120408) and the tool is tested under conditions corresponding to light interrupted cutting of hardened steel, as follows:

material to be cut: carburized hardened steel SCM415H having a hardness of HRC62, a diameter of 100 mm and a length of 300 mm, with six axial V grooves; and cutting conditions: cutting speed V=200 m/min., feed rate f=0.15 mm/rev., depth of cut d=0.2 mm, dry-cutting to examine the tool's life before it chips or is similarly damaged, as shown in Table 2.

Sample No. 2-5 having cBN grains without containing Si has life slightly shorter than Sample Nos. 2-1 to 2-4 and 2-6 to 2-9 containing a total of at least 0.001% by mass and at most 0.5% by mass of the elements Si, Ga, La before they chip or are similarly damaged. Furthermore, Sample Nos. 2-1, 2-2, 2-6 and 2-8 with cBN grains containing a total of at least 0.05% by mass and at most 0.3% by mass of the elements Si, Ga, La have further longer life than Sample No. 2-4 containing less than 0.05% by mass of the elements and Sample Nos. 2-3, 2-7 and 2-9 containing more than 0.3% by mass of the elements before they chip or are similarly damaged.

EXAMPLE 3

Hard metal pot and bowl are used to mix TiN and Al together at a variety of blending ratios as shown in FIG. 3. The obtained powder is thermally treated in a vacuum at 1200° C. for 30 minutes and the obtained compound is fractured to obtain a powdery binder. Then the binder and cBN powder having an average grain size of 0.8 μm are mixed together at a ratio in volume of 40:60, and held in a vacuum furnace at 900° C. for 20 minutes and thus degassed. Furthermore this powder is sintered under 5 GPa at 1300° C. for 20 minutes. The obtained sintered compact of cBN is subjected-to inert-gas fusion infrared detection to measure an amount of oxygen in the sintered compact. The measurement and the binder's Al content are shown in Table 3.

TABLE 3

| Sample No. | Amount of Oxygen in Sintered Compact (% by mass) | Binder's Al Content (% by mass) | Life (min.) |
| --- | --- | --- | --- |
| 3-1 | 1.8 | 4 | 17.2 |
| 3-2 | 2.3 | 7 | 23.9 |
| 3-3 | 3.1 | 18 | 27.3 |
| 3-4 | 3.5 | 27 | 32.8 |
| 3-5 | 4.4 | 35 | 31.4 |
| 3-6 | 7.5 | 47 | 18.7 |

This sintered compact is used to produce a tool (ISO model: SNGA120408). The tool is used for heavy interrupted cutting of hardened steel to examine the tool's life before the tool chips or is similarly damaged under the following conditions:

material to be cut: carburized hardened steel SCr420H having a hardness of HRC63, a diameter of 100 mm and a length of 300 mm, with eight axial U grooves; and cutting conditions: cutting speed V=150 m/min., feed rate f=0.15 mm/rev., depth of cut d=0.2 mm, dry-cutting.

Table 3 shows a result thereof.

Sample No. 3-6 corresponding to a sintered compact of cBN containing more than 5% by mass of oxygen and a binder containing more than 40% by mass of Al and Sample No. 3-1 with a binder containing less than 5% by mass of Al have shorter life than the other Sample Nos. 3-2 to 3-5 before they chip or are similarly damaged.

The present sintered compact of cBN contains a catalyst in an amount precisely controlled to achieve large strength as well as excellent thermal conductance. This allows the sintered compact to be utilized for light interrupted cutting of hardened steel of large hardness as well as heavy interrupted cutting of the steel. Conventional tools do not provide satisfactory life when they are used for heavy interrupted cutting causing sporadic damage despite low cutting speed, in particular. The present sintered compact can be used to produce a tool that can be used for heavy interrupted cutting, and still have steady life and also achieve a cutting speed higher than conventional.

While the present invention has been described in connection with an effect of a catalytic element contained in cBN grains, it is similarly effective to add a compound containing these elements to cBN powder, a binder and the like, and sintering them.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A high-strength, highly thermally conductive sintered compact of cubic boron nitride containing cubic boron nitride (cBN) grains and a binder binding said cBN grains together, the sintered compact being formed of:
   at least 40% by volume and at most 85% by volume of cBN grains; and
   a binder corresponding to a remainder and formed of at least one selected from the group consisting of a nitride, a carbide, a boride, and an oxide of an element belonging to the 4a, 5a and 6a groups of the periodic table and a solid solution thereof, an aluminum compound, and an unavoidable impurity, wherein said cBN grains contain at most 0.03% by mass of Mg and at least 0.001% by mass and at most 0.05% by mass of Li.

2. The sintered compact of claim 1, wherein said cBN grains contains at most 0.01% by mass of Mg and at least 0.01% by mass and at most 0.03% by mass of Li.

3. The sintered compact of claim 1, wherein said cBN grains contain a total of at least 0.001% by mass and at most 0.3% by mass of at least one element selected from Ca, Sr, Ba and Be.

4. The sintered compact of claim 1, wherein said cBN grains contain a total of at least 0.001% by mass and at most 0.5% by mass of at least one element selected from Si, Ga and La.

5. The sintered compact of claim 1, wherein said cBN grains contain a total of at least 0.01% by mass and at most 0.1% by mass of at least one element selected from Ca, Sr, Ba and Be.

6. The sintered compact of claim 1, wherein said cBN grains contain a total of at least 0.05% by mass and at most 0.3% by mass of at least one element selected from Si, Ga and La.

7. The sintered compact of claim 1, wherein said sintered compact contains at most 5% by mass of oxygen and said binder contains at least 5% by mass and at most 40% by mass of Al.

8. The sintered compact of claim 1, containing at least 50% by volume and less than 70% by volume of cBN grains.

\* \* \* \* \*

UNITED STATES PATENT AND TRADEMARK OFFICE
CERTIFICATE OF CORRECTION

PATENT NO. : 7,081,424 B2
APPLICATION NO. : 10/981431
DATED : July 25, 2006
INVENTOR(S) : Okamura et al.

It is certified that error appears in the above-identified patent and that said Letters Patent is hereby corrected as shown below:

Column 2,
Line 5, replace "provides-a" by --provides a--;

Column 6,
Line 33, replace "f = 0.1" by --$f$ = 0.1--;
Line 33, replace "d = 0.2" by --$d$ = 0.2--;
Line 60, replace "*Comparative Example" by --*: Comparative Example--;

Column 7,
Line 15, replace "0;01%" by --0.01%--;

Column 8,
Lines 5 and 59, replace "f = 0.15" by --$f$ = 0.15--;
Lines 5 and 59, replace "d = 0.2" by --$d$ = 0.2--;
Line 34, replace "subjected-to" by --subjected to--.

Signed and Sealed this

Thirteenth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,081,424 B2 Page 1 of 1
APPLICATION NO. : 10/981431
DATED : July 25, 2006
INVENTOR(S) : Okamura et al.

It is certified that error appears in the above-identified patent and that said Letters Patent is hereby corrected as shown below:

Column 10,
Line 7, after "grains" replace "contains" by --contain--.

Signed and Sealed this

Eighth Day of July, 2008

JON W. DUDAS
*Director of the United States Patent and Trademark Office*